(12) United States Patent
Robinson et al.

(10) Patent No.: US 8,983,191 B2
(45) Date of Patent: Mar. 17, 2015

(54) DYNAMIC RECOGNITION OF WEB ADDRESSES IN VIDEO

(75) Inventors: David John Robinson, Skipton (GB); Craig Avison-Fell, Settle (GB)

(73) Assignee: EchoStar UK Holdings Limited, Steeton (GB)

( * ) Notice: Subject to any disclaimer, the term of this patent is extended or adjusted under 35 U.S.C. 154(b) by 797 days.

(21) Appl. No.: 12/906,656

(22) Filed: Oct. 18, 2010

(65) Prior Publication Data

US 2012/0093415 A1    Apr. 19, 2012

(51) Int. Cl.
- G06K 9/00   (2006.01)
- G06K 9/46   (2006.01)
- G06K 9/32   (2006.01)

(52) U.S. Cl.
CPC ................... *G06K 9/3266* (2013.01)
USPC .......................... 382/190; 382/182

(58) Field of Classification Search
USPC ................................. 382/182, 190
See application file for complete search history.

(56) References Cited

U.S. PATENT DOCUMENTS

| | | | |
|---|---|---|---|
| 5,262,860 A * | 11/1993 | Fitzpatrick et al. | 348/461 |
| 6,253,238 B1 * | 6/2001 | Lauder et al. | 709/217 |
| 6,963,906 B2 * | 11/2005 | Portuesi | 709/217 |
| 7,340,763 B1 * | 3/2008 | Harris | 725/81 |
| 7,546,538 B2 * | 6/2009 | Shuping et al. | 715/760 |
| 7,751,805 B2 * | 7/2010 | Neven et al. | 455/414.3 |
| 2003/0044068 A1 * | 3/2003 | Kagehiro et al. | 382/182 |
| 2004/0190779 A1 * | 9/2004 | Sarachik et al. | 382/199 |
| 2005/0193018 A1 * | 9/2005 | Rosdahl | 707/104.1 |
| 2005/0286805 A1 * | 12/2005 | Yoshida | 382/305 |
| 2010/0316300 A1 * | 12/2010 | Epshtein et al. | 382/229 |

FOREIGN PATENT DOCUMENTS

WO    WO 2004/029865    *    4/2004    ........... G06K 9/20

OTHER PUBLICATIONS

Jain et al., Automatic text location in images and video frames, pattern recognition, vol. 31, No. 12 pp. 2055-2076, 1998.*

* cited by examiner

Primary Examiner — John Strege
(74) Attorney, Agent, or Firm — Ingrassia Fisher & Lorenz, P.C.

(57) ABSTRACT

One embodiment described herein may take the form of a system or method for dynamically recognizing an Internet address within a video or audio component of a multimedia presentation on a distribution system or network such as, but not limited to, a satellite, cable or Internet network. In general, the embodiment may analyze the audio portion of the presentation or one or more frames of a video component to detect the presence of a web address within the one or more frames. In the embodiment where the audio portion is analyzed, the system may perform a voice recognition or a similar analysis on the audio portion to detect the utterance of a web address. Similarly, one embodiment analyzing the one or more frames of the video component may comprise performing an optical character recognition (OCR) of the frame.

19 Claims, 7 Drawing Sheets

DYNAMIC RECOGNITION OF WEB ADDRESSES IN VIDEO

TECHNICAL FIELD

Embodiments disclosed herein relate generally to providing multimedia content over a network, and more particularly to dynamically recognizing an Internet or web address within a video component of a multimedia presentation of a distribution system.

BACKGROUND

Many multimedia presentations provided through a distribution system include a video and audio component. In addition to the entertainment content of the presentation, many such presentations include advertisements. For example, in a television presentation, several advertisements may be included within the multimedia stream that advertise products to the viewer of the presentation in between or during the television programs. In general, these advertisements provide the viewer with information about a product or service, as well as the company that provides the product or service.

In many advertisements included in a multimedia presentation, information about the product and/or company offering the product may include a uniform resource locator (URL) or "web address" that correspond to a website available on the Internet. Such websites may contain more information about the product or the company offering the product than may be provided generally within the advertisement. When presenting a website address in the advertisement, many ads will often instruct the viewer to access the website through the viewer's computer or other device connected to the Internet to learn more or to purchase the advertised product. In this manner, the advertisers may provide additional information about the company's products without incurring substantial expense. Thus, one intention of such advertisements is to drive the viewers of the multimedia presentation to an associated website as a simple and inexpensive way to learn about or purchase the advertised product or service.

BRIEF SUMMARY

One implementation may take the form of a method for detecting a web address in one or more frames of a video multimedia presentation. The method may comprise the operations of receiving a first frame from a video component of a multimedia presentation and analyzing the first frame for a pattern of characters, wherein the pattern of characters comprises at least a portion of a web address associated with a website available on the Internet. In addition, the operations may include obtaining the entire web address from the first frame, providing the first frame to a display device for display and indicating the obtained web address within one or more frames of the video component.

Another implementation may take the form of a receiver for a distribution system comprising a microprocessor and a computer-readable storage medium. The computer readable storage medium may store a computer-executable code that, when executed by the microprocessor, causes the receiver to perform several operations. In one embodiment, the receiver may perform the operations of receiving a first frame from a video component of a multimedia presentation, analyzing the first frame for a pattern of characters, wherein the pattern of characters comprises at least a portion of a web address associated with a website available on the Internet and, if the pattern of characters is not found in the first frame, receiving a second frame from the video component of the multimedia presentation and analyzing the second frame for the pattern of characters. If the pattern of characters is found, then the receiver may perform the operations of obtaining the entire web address from the first frame, verifying the web address by accessing the website associated with the web address through a modem module and providing a query box to a display device for display, the query box requesting an input from a user to access the website associated with the obtained web address.

Yet another implementation may take the form of a method for detecting a web address in one or more frames of a video multimedia presentation. The method may comprise the operations of receiving a first frame of a video and performing an optical character recognition analysis on the first frame to detect the presence of the pattern of characters within the first frame, wherein the pattern of characters comprises at least a portion of a web address associated with a website available on the Internet. In addition, the method may include obtaining the entirety of the web address from the analysis of the first frame, creating a link to the website associated with the web address and providing a query box to a first display device for display, the query box requesting an input from a user to access the website associated with the obtained web address.

DETAILED DESCRIPTION

One embodiment described herein may take the form of a system or method for dynamically recognizing an Internet address within a video or audio component of a multimedia presentation on a distribution system or network such as, but not limited to, a satellite, cable or Internet network. In general, the embodiment may analyze the audio portion of the presentation or one or more frames of a video component to detect the presence of a web address within the one or more frames. In the embodiment where the audio portion is analyzed, the system may perform a voice recognition or a similar analysis on the audio portion to detect the utterance of a web address. Similarly, one embodiment analyzing the one or more frames of the video component may comprise performing an optical character recognition (OCR) of the frame. In still other embodiments, image recognition may be performed on the one or more frames to detect the web address through pixel analysis, edge detection or any other image recognition analysis.

Once detected, the embodiment may access the Internet or a maintained database to verify that the detected web address is valid. Upon validation, the embodiment may highlight or otherwise indicate the detected web address on the viewer's screen such that access of the webpage located at the detected web address may be provided to the viewer of the video of the multimedia presentation. In addition, the embodiment may provide a selectable link within the multimedia presentation that links the detected web address with an associated website.

In general, the use of the term "web address" and the like as used herein may refer to any content available on a network, including the Internet. Thus, a web address may not necessarily relate to a website, but may access only portions of web content, such as a news-feed, a video, an audio clip, an animated image and the like. As such, it should be appreciated that providing a selectable link to the web content associated with the detected web address may include linking to and possibly presenting the web content absent displaying a website.

Figure 1:
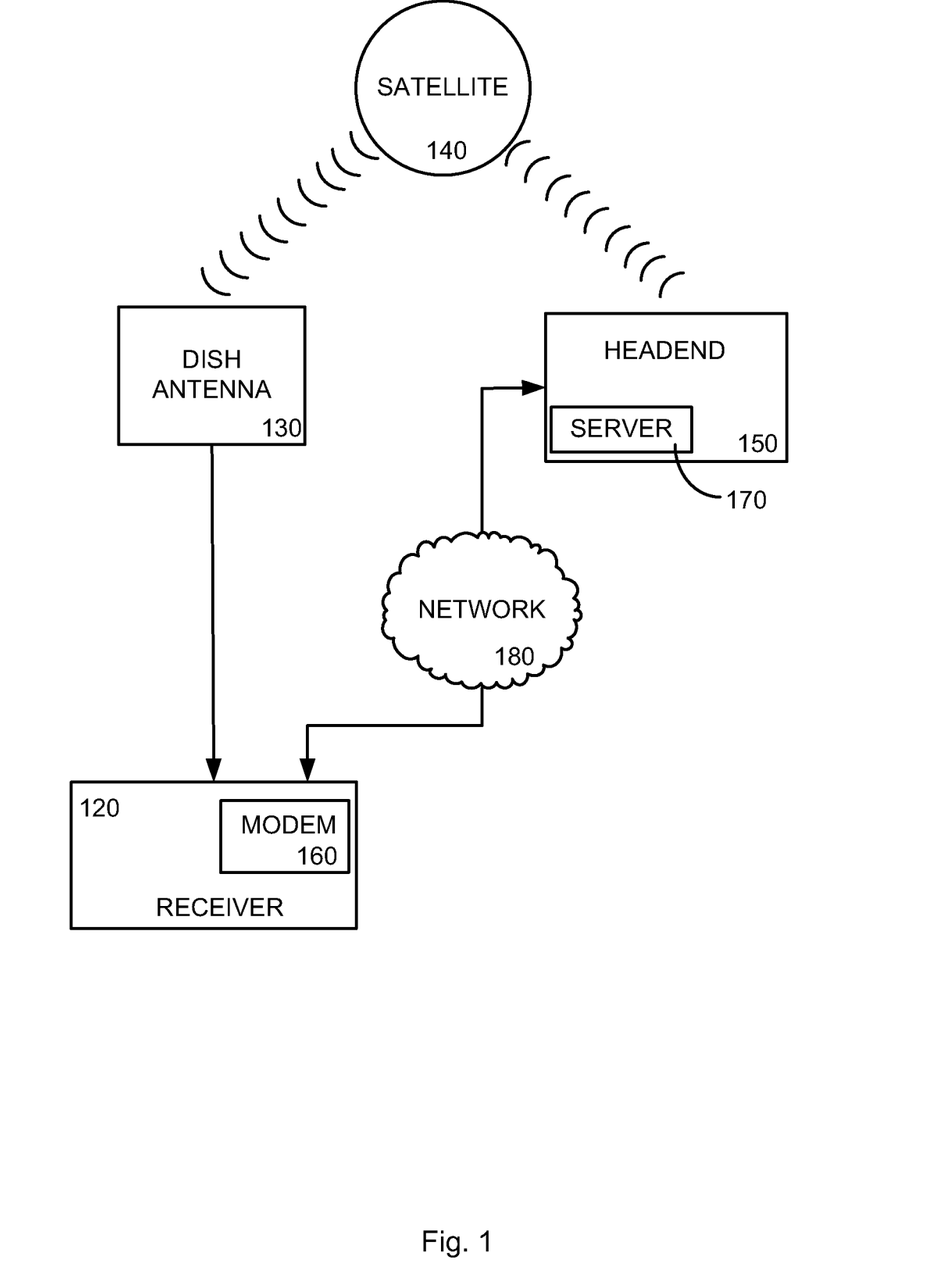
FIG. 1 depicts an exemplary satellite distribution system that may utilize a first embodiment to dynamically recognize web addresses within a video multimedia presentation.

FIG. 1 depicts an exemplary satellite distribution system that may utilize a first embodiment of the present disclosure to dynamically recognize web addresses within a multimedia presentation. The satellite system of FIG. 1 is but one example of a system that may dynamically recognize web addresses within a multimedia presentation. Alternatively, a digital cable system or any other system may also utilize the embodiments described herein. Further, it should be appreciated that the system may include more or fewer components than described herein and such components may be interconnected in any manner. Additionally any type of signal may be communicated by the system, such as a video signal, an audio signal, an interactive signal, other signal types and any of various combinations and/or permutations of the foregoing. In general, any distribution system that provides multimedia presentations to a user for viewing may utilize the embodiments described herein.

The system of FIG. 1 may include at least one receiver 120 configured to provide a user with an interface to the system. In general, the receiver 120 of the system may receive an encrypted and/or encoded signal and convert it into a signal that a display or other compatible device may recognize and manipulate in order to present the multimedia presentation to one or more users. Further, the receiver 120 may provide the converted signal to a display device, such as a television or computer screen, for display to the user. In one implementation, the receiver 120 may receive the encrypted signal from a satellite 140 or through a digital cable or network connection. Further, in the satellite and digital cable configurations, the encrypted signal may be generated by a headed 150 and transmitted to the receiver 120. Generally, the head-end 150 may be a master facility that receives programming signals for processing and distribution to various systems. In a satellite television provider, the head-end 150 may transmit the audio/visual signal to a satellite 140 for redistribution to end users, for example, subscribers to a satellite or cable television distribution system. Upon receipt, the satellite 140 may transmit the signal to a dish antenna 130 connected to the receiver 120 for decryption.

In a cable system configuration, the head-end 150 may transmit the multimedia signal directly to the receiver 120 over a cable network connection. For example, the signal may be provided to the receiver 120 through a cable connected, directly or indirectly, between the receiver 120 and the head-end 150. Alternatively, the signal may be provided over a network 180 connection, utilizing for example a modem 160 associated with the receiver 120.

Additionally, the head-end 150 may utilize the network 180 to provide other communication signals to the receiver 120. For example, the head-end 150 may utilize the network 180, the satellite 140 or other telecommunications connections to provide programming updates to the receiver 120. Similarly, the receiver 120 may communicate information to the head-end 150 or to other networked devices, for example, an instruction and information used to store information at the head-end, within the network 180 or otherwise. In one implementation, the network 180 may be the Internet such that the signals transmitted over the network may include an Internet protocol (IP) address and may take the form of standardized packets of information for proper routing. In addition, the network may include and/or utilize various communication and networking topologies such as wireless, for example, WiFi, Bluetooth, WiMax, 3G, 4G and the like, and/or wired, such as POTS, LAN, WLAN, and the like, and/or any other known or hereinafter developed method to connect to the Internet.

In one embodiment, the receiver 120 may be a set-top box ("STB") for a satellite distribution system. However, although the terms "receiver" and "satellite system," or variants thereof, are used throughout this document, it should be understood that other hardware and/or networks may be used for example, one embodiment may employ a cable box and a cable network. Accordingly, the term "receiver" is intended to encompass other similar hardware, just as networks other than satellite systems are embraced by that term or the words "distribution network." Another embodiment may employ a terrestrial set-top box or converter receiving a broadcast signal via an antenna (over the air).

Further, it should be noted that, while the embodiments discussed below refer to recognizing a web address within a video component of a multimedia presentation, similar embodiments may analyze and detect the presence of a web address in the audio portion of the presentation. In general, an analysis of an audio component may occur in a similar manner as described below with reference to the video component. In addition, a detected audio web address may be confirmed and displayed to a user in response to the detection. Thus, the embodiments described below relating to the video component are included for simplicity, but may also be utilized to detect a web address in an audio component of the multimedia presentation.

Figure 2:
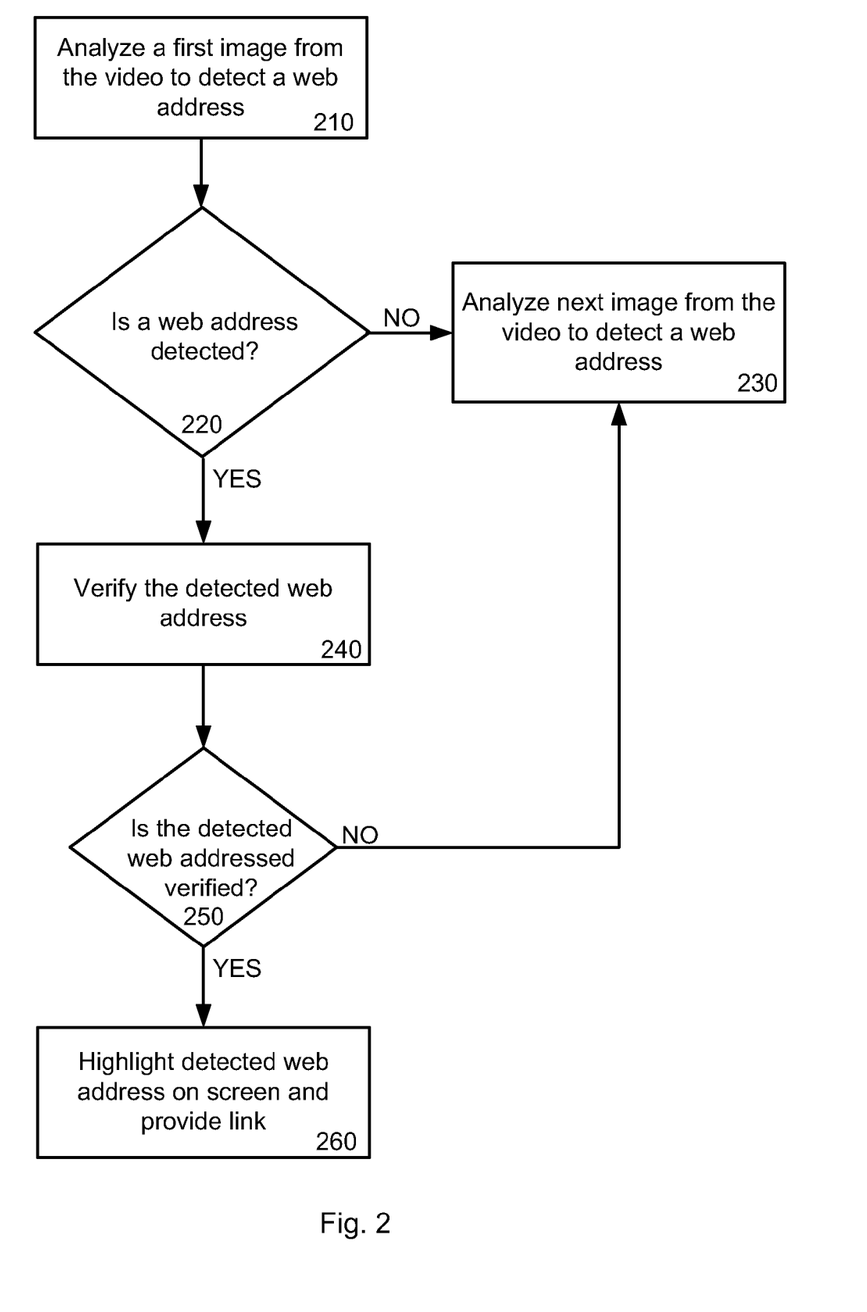
FIG. 2 is a flowchart depicting a method for a receiver to dynamically recognize a web address in a video component of a multimedia presentation and provide a link to access the web address.

FIG. 2 is a flowchart depicting a method for a receiver to dynamically recognize a web address in a video component of a multimedia presentation and to provide a link to a user to access a website associated with the detected web address. In one embodiment, the method may be performed by a set-top box of a satellite distribution system such that the web address may be included in a video stream of a multimedia presentation provided by the satellite distribution system and displayed on the user's display device. Upon detection, the receiver may create a link on the user's display device that may be selected by the user to access a website associated with the detected web address. In one embodiment, the website may be displayed on the user's display device along with or in place of the multimedia presentation.

Beginning in operation 210, the receiver may analyze an incoming multimedia presentation stream for a web address contained within a video component of the presentation. More particularly, the receiver may extract a still image or frame from the video stream of the presentation, such as after the frame has been decoded and rendered. Once rendered, the receiver may then utilize OCR technology to scan the frame for a word that matches or approximates a web address associated with an Internet website. In general, OCR is a technique of scanning an image to detect letters, words or phrases within the image. In one implementation, OCR technology may be used to scan digital images for particular words or phrases contained within the image. As used in the present disclosure, OCR technology may be utilized to detect particular letters or punctuation within a frame of a video that is similar to a web address.

Figure 3:
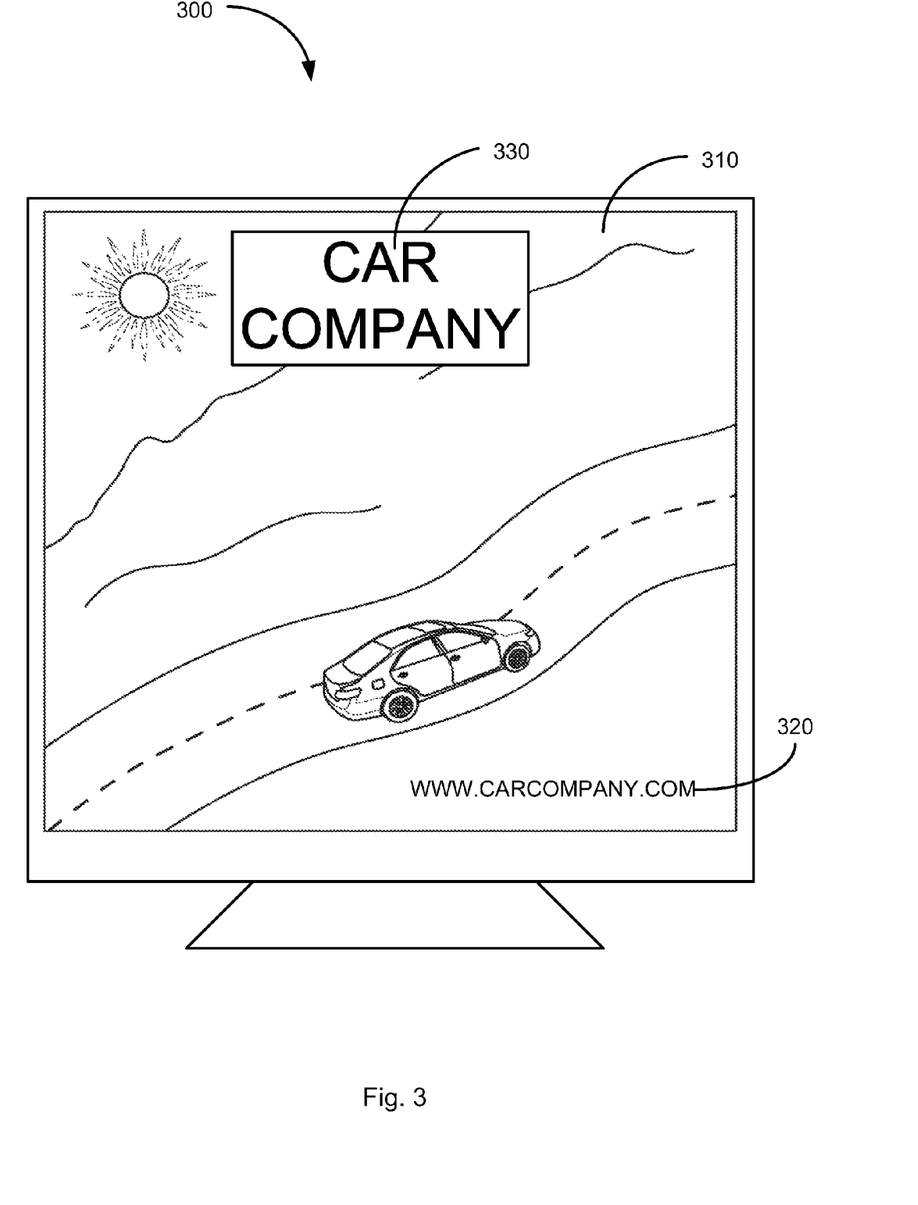
FIG. 3 is a diagram of a display device illustrating a video component of a multimedia presentation including a displayed web address that may be recognized and highlighted.

For example, FIG. 3 is a diagram of a display device 300 illustrating a frame 310 of a video presentation including a displayed web address 320 that may be recognized and highlighted by the methods and systems of the present disclosure. Continuing this particular example, the display device 300 may display an advertisement for a car as part of the display of the video component. During the ad, a web address 320 associated with a website may be presented on the display device 300 for one or more frames of the video. In general, the website associated with the web address 320 may include more information about the car being advertised or the company that manufactures the car. In addition, the advertisement may include other words or phrases other than the web address, such as pricing information, information about the manufacturer of the product and legal disclaimers. For example, in FIG. 3, the name of the car company 330 may be displayed across the top of the advertisement. Thus, any frame of the video component may include one or more words present within the frame.

Returning to FIG. 2, in general, any frame of the video component of the presentation may be analyzed to detect a web address in operation 210. Further, such analysis may occur on a frame once the video frame is decoded and/or rendered. For example, the video component may be received by the receiver in an encoded fashion. The receiver may decode the video and render the information defining the video to create the frames that are displayed on the user's display device. OCR analysis of these frames may occur once the frames are rendered. In one example, the decoded and rendered frames of the video component may be stored in a memory device associated with the receiver. In this example, OCR analysis of the frames may occur while the frames are stored in the memory device, prior to being displayed on the user's display device. In another embodiment, the OCR analysis of the frame may occur while the frame is being rendered on the user's display device. In such embodiments, however, the frame may sufficiently render the web address on the display device prior to detection of the address by the OCR analysis.

In operation 220, the receiver may determine whether a web address is detected during the OCR analysis of the frame. However, as shown in FIG. 3, the video frame may include letters, words or phrases other than the web address, such as the company name or logo. Thus, the OCR analysis of any frame 310 of a video component may be programmed to search for particular combinations of letters and punctuations to prevent or minimize words or phrases included in the frame as being falsely identified as a web address. For example, the OCR technique applied to the frame 310 may be programmed to detect the presence of the letters "www" on the screen. In this example, the presence of the term "www" may indicate to the receiver that a web address is presented on the display. Other detected letters or terms, such as "car" or "company" may not qualify as a web address and may be discarded or ignored by the receiver. In another example, the OCR technique may be programmed to detect a series of letters before and after a period with no spaces between, such as the term "XXX.XXX" (with X representing any letter). Other examples include, but are not limited to, terms such as http://, anything ending in ".com", ".net" and the like, a series of numbers that may correspond to an IP address, and so on. In general, the OCR technique may be programmed to detect any combination of letters and punctuation occurring on the user's display that may distinguish a web address from other terms that may appear within the frame.

Additionally, the receiver may be programmed with a search term that may be customized to the location of the receiver. For example, receivers located within the United States may be programmed to detect the term ".com" on the display device. Alternatively, a receiver located within the United Kingdom may be programmed to detect the term "co.uk". As mentioned, the receiver may be programmed to detect any sequence of letters and punctuation as desired to detect a web address within a frame of a video component of a multimedia presentation while ignoring other text that may not indicate a web address.

If the receiver determines in operation 220 that a web address is not present within the analyzed frame of the video component of the presentation, then the receiver may access a subsequent frame of the video component and perform a similar OCR analysis of the subsequent frame to detect the presence of a web address within that frame. In one example, the additional frame may be the next rendered frame in the video component of the multimedia presentation. However, because video is typically displayed at several frames per second, the receiver may bypass one or more frames in between accessing frames and analyzing them for a web address. In addition, the number of frames that are displayed between the analyzed frames may be at least partially based on the speed in which the receiver may perform the analysis on the frames for the web address. In general, however, once the receiver determines that a web address is not present in a frame of the video component, any subsequent frame of the video component may be selected and analyzed to detect a web address within the additional frame in operation 230.

In addition, the analysis of the frames of the video component may be limited to specific video streams within the presentation or specific times within the video stream. For example, in the embodiment where the OCR analysis is performed on a television presentation, the receiver may perform the analysis only when commercials are playing in the television stream. During broadcast of the television program, the OCR analysis of the web address may be ceased by the receiver. In one embodiment, the content may include one or more flags within the video stream that indicate to the receiver when an advertisement is beginning such that the receiver may begin the OCR analysis when a flag is detected. In this manner, only portion of the video component may be analyzed for a web address. Similarly, the OCR analysis may be performed by the receiver when a particular channel or program is selected for viewing by the user. For example, the viewer may choose to watch an infomercial program such that a web address may be presented on the user's screen at any time during the airing of the program. In this example, the receiver may consult an electronic program guide (EPG) that may contain information about the programs airing on the distribution system. The EPG may include flags or other indicators that are received by the receiver such that, when a particular channel or program is selected and a flag is detected, the receiver may continually operate the OCR search for a web address while the user is viewing that particular channel or program. Further, when the viewer changes the channel, the receiver may return to a default setting where the web address search is only conducted during commercial presentations. In general, the receiver may limit the times and video streams on which the web address search is conducted in any manner to preserve the processing power of the receiver during use.

If the receiver determines that a web address is present in the frame of the multimedia presentation in operation 220, then the receiver may verify the detected web address in operation 240. To verify the detected address, the receiver may gather the entire web address from the portion detected by the OCR analysis. For example, assuming that the OCR technology is programmed to detect "www" within the frame, the receiver may retain any word that contains the "www" portion. Thus, the entire web address (www.carcompany.com in FIG. 3), may be obtained by the detected portion. Once the entire address is obtained, the receiver may verify the detected web address by accessing the Internet and using the detected web address to obtain a website. If a valid website matching the detected web address is present, then the address may be verified. In other implementations, the receiver may maintain a list of verified web addresses in a database and may compare the detected web address with the list of verified web addresses. In this example, verification may occur if the detected web address matches one or more in the list of verified web addresses.

In operation 250, the receiver may determine if the detected web address is verified. If not verified, the receiver may discard the detected web address and continue on to operation 230 to analyze a subsequent video frame. However, if the detected web address is verified in operation 250, then the receiver may highlight or otherwise indicate the presence of the web address on the user's display device in operation 260. In addition, the receiver may create a link within the video frame that may allow the user to access the website associated with the detected web address. In addition, the receiver may store one or more verified web addresses that may be accessed by the user of the receiver.

The receiver may highlight or indicate the detected web address on the user's display in several ways. In one embodiment, the receiver may highlight the detected web address by altering the color of the lettering of the web address on the user's display. In another embodiment, such as that shown in FIG. 4, the receiver may underline the web address 420 on the user's display 400 within the analyzed video frame 410. In either embodiment, the receiver may utilize the OCR analysis to detect an approximate position of the web address 420 within the video frame 410 and alter the rendered frame accordingly. In addition, the highlighted web address may be maintained on the user's display device 410 for any number of frames of the video component, such that the user may interact with the detected web address.

Figure 4:
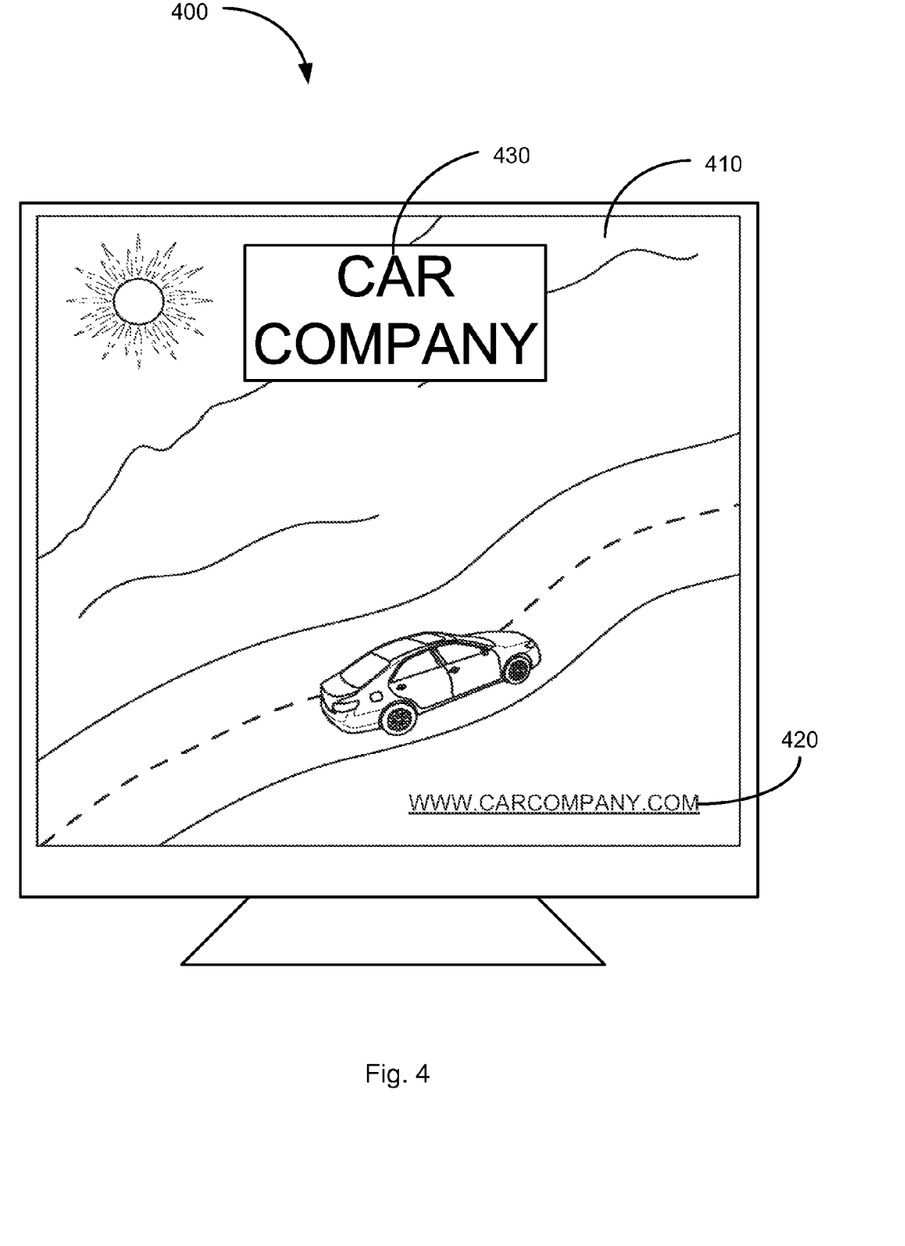
FIG. 4 is a diagram of a display device illustrating a video component of a multimedia presentation including a recognized web addressed that is highlighted by underlining the web address on a display device.

In addition to highlighting the web address, the receiver may also create a link within the video frame that provides a path to the website associated with the web address. For example, as stated above, the receiver may detect an approximate position of the web address 420 within the video frame 410. Upon highlighting the detected address, the receiver may create a hot spot near or within the approximate position of the web address that includes a link to the associated website. The hot spot within the frame may be a spot that, when selected by a user, creates a path to the associated website. In one embodiment, the user may use an input device to the receiver or to the display device 400 to select the hot spot within the video frame 410 to activate the link to the indicated website. In another embodiment, the receiver may provide a direct link to the website associated with the web address on the user's display device. Thus, it is not required that the link be provided within the video frame, but may instead be provided on any display device associated with the receiver and may further be selected by the user through the display device.

Figure 5:
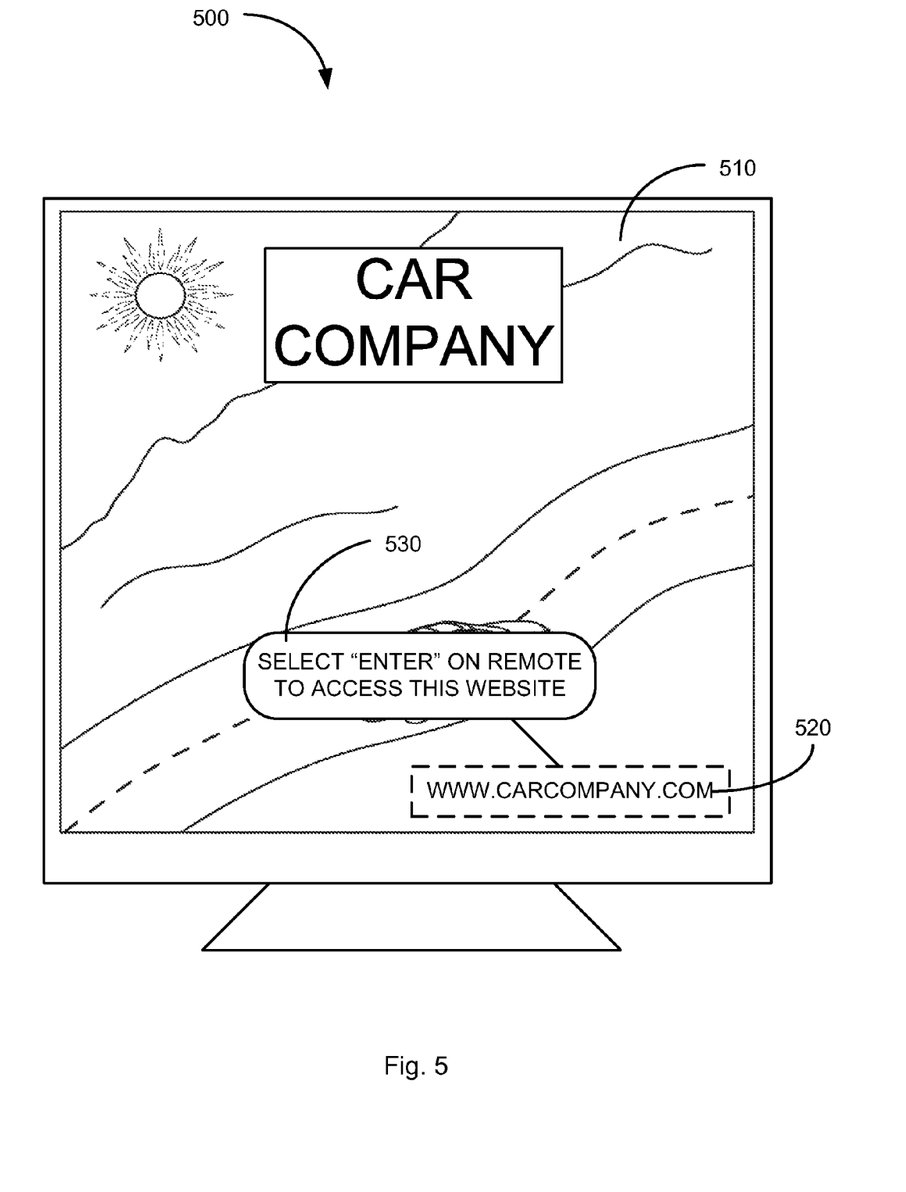
FIG. 5 is a diagram of a display device illustrating a video component of a multimedia presentation including a recognized web addressed that is highlighted on the display device and a query box directed at a user of the display device.

FIG. 5 illustrates an additional embodiment of highlighting a detected web address 520 within a frame 510 of a video component of a multimedia presentation. In the embodiment shown, the receiver may insert a query box 530 within the video frame that instructs the user to utilize an input device to the receiver or display device 500 to select the detected web address 520. Thus, as shown, the video frame 510 may include a query box 530 that instructs the user to press "ENTER" on the user's remote control to access the website associated with the detected web address 520. Thus, rather than providing a hot spot within the video frame 510, the receiver may simply receive the proper instructed for input to activate the link associated with the detected web address 520. In general, the receiver may query for any type of input from the user to access the created link. In addition, such a query box 530 is not required in some embodiments. Rather, the user may be previously aware of the input required to access the detected web address 520 and may provide such input without a prompt from the receiver, perhaps in response to the web address being underlined or otherwise highlighted.

Figure 6:
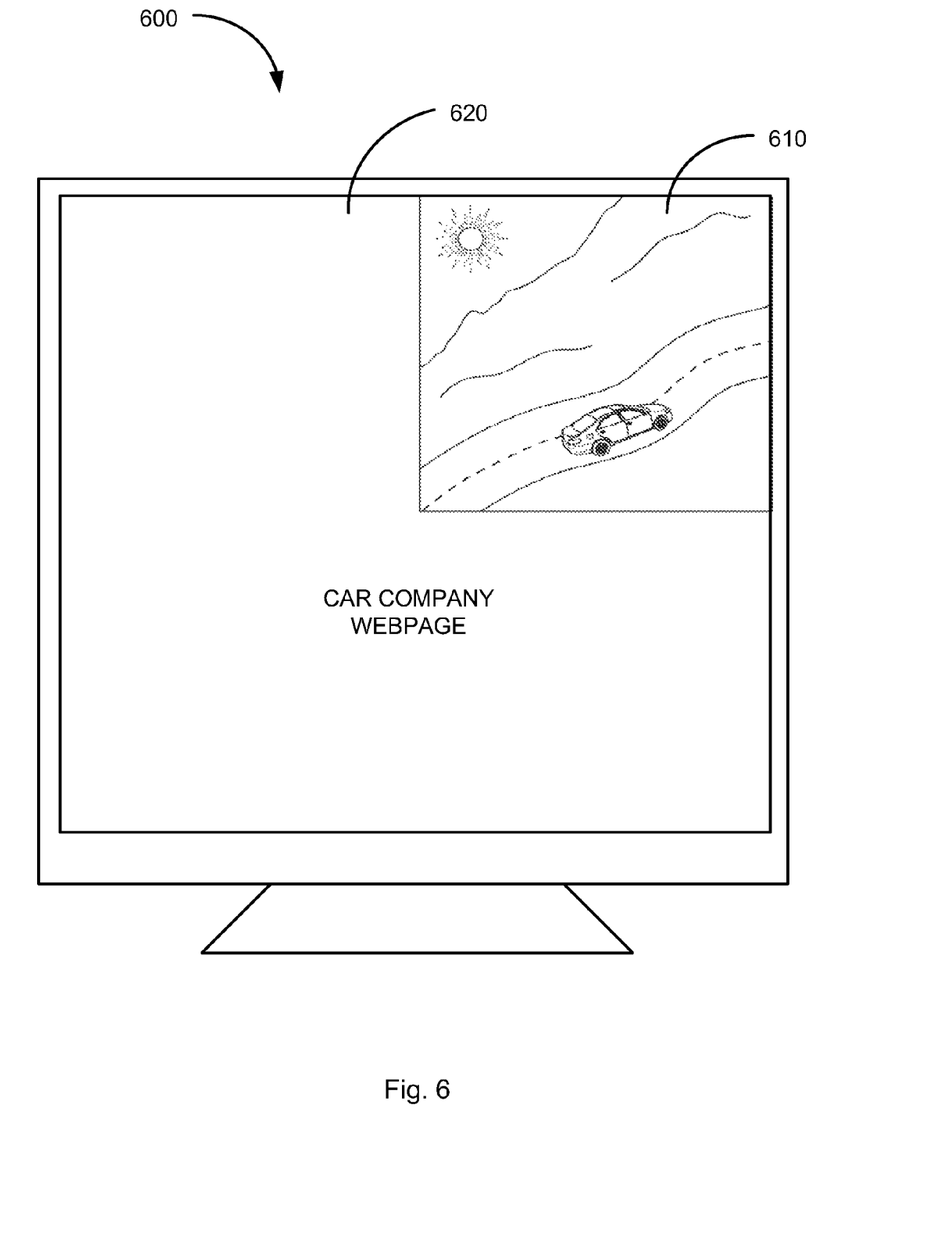
FIG. 6 is a diagram of a display device illustrating a video component of a multimedia presentation and a selected web page displayed simultaneously on the display device.

Upon selection of the link by the user, the receiver may access the Internet and provide the user with the website associated with the web address. In one embodiment, such as shown in FIG. 6, the website 620 may be provided on the same display device 600 through which the web address was selected. In the example shown, the video component 610 of the multimedia presentation may be located within a smaller window on the user's display device 600 while the webpage associated with the detected web address comprises the rest of the display space of the display device. In other embodiments, the webpage may comprise the entire display space such that the video component is no longer displayed. In yet another embodiment, the webpage may be launched within an interactive television feature of the receiver and displayed on the user's display device 600. In still another embodiment, the receiver may launch the webpage on a separate display device that is not displaying the video component of the multimedia presentation. The separate display device may be any type of computing device that is capable of displaying a webpage, such as a desktop computer, handheld computing device, personal digital assistant, mobile telephone, music or audio player (such as an MP3 player) and so on.

Figure 7:
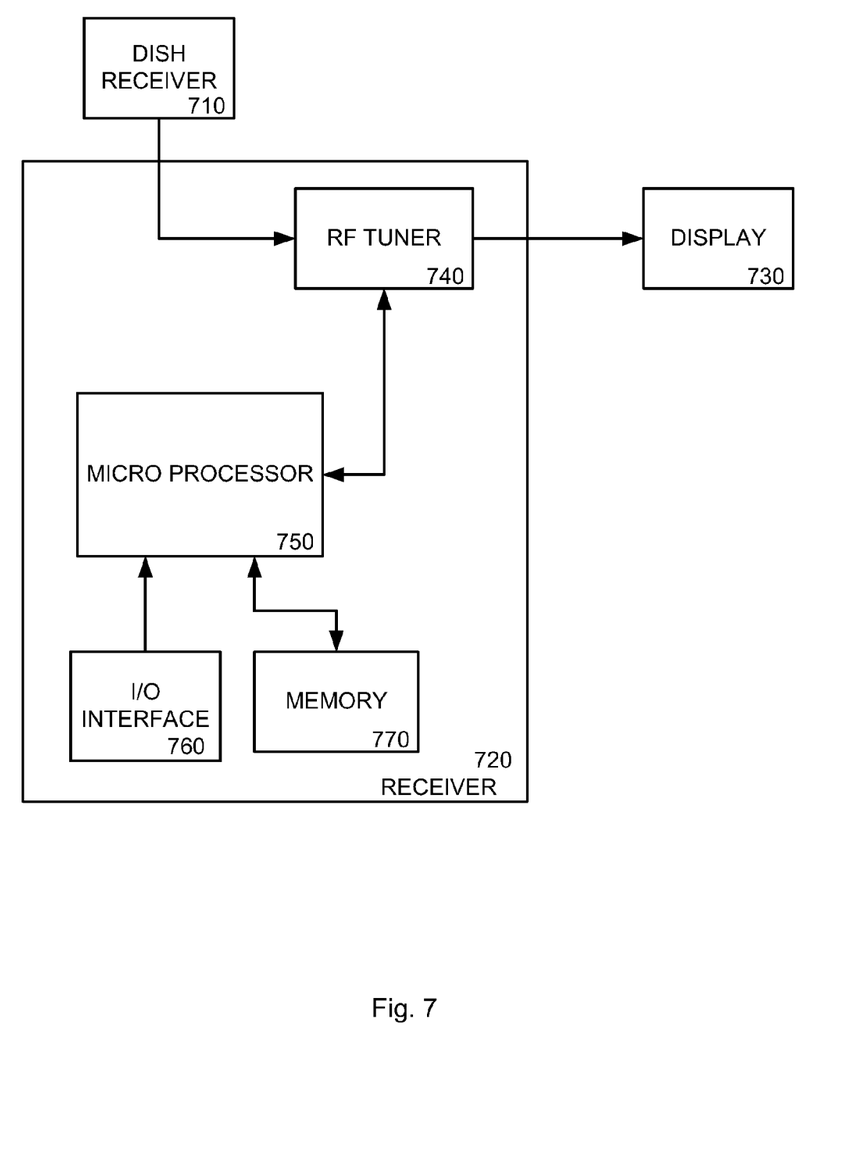
FIG. 7 is a block diagram illustrating an example of a receiver which may be used in implementing embodiments described herein.

FIG. 7 is a block diagram illustrating an example of a receiver 720 which may be used in implementing embodiments described herein. The receiver 720 may receive a transmitted multimedia signal from a satellite dish receiver 710 and may transmit a translated signal to a user's display 730 for display to the user. The multimedia signal may be received at the receiver 720 by a radio frequency (RF) tuner 740. The RF tuner 740 may translate the received signal and provide that signal to the user's display 730. Although not shown, the satellite dish receiver 710 may include a low noise block (LNB) or other components to decrypt and transmit the received multimedia signal. Similarly, the receiver 720 may include more or fewer components as those shown Further, the receiver 720 may include a microprocessor 750 coupled to memory 770, as described in more detail below. The receiver may also include an input/output (I/O) interface 760 to interface one or more I/O bridges or I/O devices. I/O devices may also include an input device (not shown), such as an infra-red signal provided by remote control device or alphanumeric input device, including alphanumeric and other keys for communicating information and/or command selections to the microprocessor 750. The I/O device may be utilized by a user to provide inputs and commands to the receiver 720 to control the receiver or display.

System 700 may include a dynamic storage device, referred to as memory 770, or a random access memory (RAM) or other devices coupled to the receiver 720 for storing information and instructions to be executed by the microprocessor 750. Memory 770 also may be used for storing temporary variables or other intermediate information during execution of instructions by the microprocessor 750.

According to one embodiment, the above techniques may be performed by a receiver 720 in response to microprocessor 750 executing one or more sequences of one or more instructions contained in memory 770. These instructions may be read into memory 770 from another machine-readable medium, such as a storage device. Execution of the sequences of instructions contained in memory 770 may cause the microprocessor 750 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as memory 770. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowchart of FIG. 2 is illustrative only. Alternative embodiments may add operations, omit operations, or change the order of operations without affecting the spirit or scope of the present invention.

The foregoing merely illustrates certain principles and embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the embodiments and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method executable by a television receiver to dynamically detect a web address in one or more frames of a video multimedia presentation, the method comprising:
   receiving and decoding the video multimedia presentation by the television receiver;
   automatically extracting a first frame from the decoded video multimedia presentation, wherein the automatic extracting is initiated by the television receiver without input by the user;
   analyzing the first frame to identify a pattern of characters, wherein the pattern of characters comprises at least a portion of a web address associated with a website available on the Internet;
   if the pattern of characters is identified within the first frame, then obtaining the entire web address from the first frame, creating a selectable link that links to a website associated with the web address, and indicating the obtained web address within one or more frames of the video component;
   providing the first frame to a display device for display;
   bypassing analyzing a second frame in the video multimedia presentation, the second frame occurring later in time than the first frame;
   providing the second frame to the display device for display;
   analyzing a third frame to identify the pattern of characters, the third frame occurring later in time than the second frame; and
   providing the third frame to the display device for display.

2. The method of claim 1 further comprising:
   automatically verifying the web address by accessing the website associated with the web address prior to indicating the obtained web address.

3. The method of claim 2 further comprising:
   discarding the obtained web address if the web address is not verified.

4. The method of claim 1 further comprising:
   if no web address is found in the first frame, then the television receiver automatically extracting a second frame from the decoded video multimedia presentation after a period of time has elapsed; and
   analyzing the second frame for the pattern of characters.

5. The method of claim 1 wherein the period of time is greater than the time to analyze the first frame of the decoded video multimedia presentation.

6. The method of claim 1 the analyzing occurs after the first frame has been rendered to the display device.

7. The method of claim 1 further comprising the television receiver:
   determining an approximate position within the first frame of the obtained web address; and
   creating a hotspot within the one or more frames at the approximate position within the first frame of the obtained web address that is selectable by a user through the operations of:
      manipulating a cursor on the display device over the hotspot; and
      selecting the hotspot by providing an input from an input device.

8. The method of claim 1 wherein the pattern of characters is configured to detect a country-specific web address.

9. The method of claim 1 wherein the extracting and analyzing continually occurs when the user is viewing a video multimedia presentation associated with an indicator provided in an electronic program guide.

10. A receiver that receives television programming, the receiver comprising:
   a microprocessor; and
   a computer-readable storage medium, the computer readable storage medium storing a computer-executable code that, when executed by the microprocessor, causes the receiver to perform the operations of:
      receiving a multimedia presentation;
      initiating the automatic extraction of a first frame from the multimedia presentation;

analyzing the first frame for a pattern of characters, wherein the pattern of characters comprises at least a portion of a web address associated with a website available on the Internet;

if the pattern of characters is not found in the first frame, the receiver initiating the automatic extraction of a second frame from the multimedia presentation and analyzing the second frame for the pattern of characters, otherwise; and if the pattern of characters is identified within the first frame, then obtaining the entire web address from the first frame, verifying the web address by accessing the website associated with the web address through a modem module, creating a selectable link that links to the website associated with the web address, and providing a query box to a display device for display, the query box requesting an input from a user to access the website associated with the obtained web address if the pattern of characters is identified within the first frame, bypassing analyzing the second frame for the pattern of characters.

11. The receiver of claim 10 wherein the first and second frames are automatically extracted without input from the user.

12. The receiver of claim 10 wherein the first frame is rendered for playback on the display device and stored in the computer-readable storage medium prior to analyzing the first frame for a pattern of characters.

13. The receiver of claim 10 further comprising:
a display interface, the display interface configured to communicate with the display device and wherein the computer-executable code further causes the receiver to perform the operations:
utilizing the display interface to communicate the first frame and query box to the display device for display.

14. The receiver of claim 13 wherein the computer-executable code further causes the receiver to perform the operations:
creating a link to the website associated with the web address;
receiving an input from an input device selecting the link; and
utilizing the display interface to communicate the website associated with the web address to the display device for display.

15. The receiver of claim 10 wherein the analyzing operation further comprises:

performing an optical character recognition analysis on the first frame to detect the presence of the pattern of characters within the first frame.

16. The receiver of claim 14 wherein the website and the first frame are displayed concurrently on the display device.

17. A method executable by a television receiver for dynamically detecting a web address in one or more frames of a video multimedia presentation, the method comprising:
receiving the video multimedia presentation by the television receiver;
automatically extracting a first frame from the video multimedia presentation, wherein the automatic extraction is initiated by the television receiver;
rendering the first frame for presentation on a first display device;
after rendering the first frame for presentation on the first display device, automatically performing an optical character recognition analysis on the first frame to detect the presence of the pattern of characters within the first frame, wherein the pattern of characters comprises a portion of a web address associated with a website available on the Internet; and
if the pattern of characters comprises the portion of the web address, the television receiver obtaining the entirety of the web address from the analysis of the first frame, creating a link to the website associated with the web address, and providing a query box to the first display device for display, the query box requesting an input from a user to access the website associated with the obtained web address; and
if the pattern of characters comprises the portion of the web address, bypassing the optical character recognition analysis of at least one subsequent frame in the video multimedia presentation.

18. The method of claim 17 wherein the first frame is extracted and the optical character recognition is performed without input from the user.

19. The method of claim 17 further comprising:
receiving an input from an input device indicating a request to access the website;
obtaining the website from the Internet in response to receiving the input; and
providing the obtained website to a second display device for display on the second display device.

* * * * *